(12) United States Patent
Scholten et al.

(10) Patent No.: US 8,222,362 B2
(45) Date of Patent: Jul. 17, 2012

(54) LATEX WITH REDUCED ODOR

(75) Inventors: Christoph Scholten, Gelsenkirchen (DE); Katja Siepen, Marl (DE)

(73) Assignee: Polymerlatex GmbH, Marl (DE)

( * ) Notice: Subject to any disclaimer, the term of this patent is extended or adjusted under 35 U.S.C. 154(b) by 831 days.

(21) Appl. No.: 11/836,989

(22) Filed: Aug. 10, 2007

(65) Prior Publication Data

US 2008/0039541 A1    Feb. 14, 2008

Related U.S. Application Data

(60) Provisional application No. 60/837,013, filed on Aug. 10, 2006.

(51) Int. Cl.
*C08L 9/08* (2006.01)
*C08F 236/10* (2006.01)
*C08F 2/38* (2006.01)
*C08J 9/30* (2006.01)

(52) U.S. Cl. ...................... 526/340; 526/347; 526/347.1

(58) Field of Classification Search .................. 526/340, 526/347, 347.1, 40
See application file for complete search history.

(56) References Cited

U.S. PATENT DOCUMENTS

| | | | |
|---|---|---|---|
| 2,432,353 A | 12/1947 | Talalay | |
| 3,330,795 A | 7/1967 | Schluter | |
| 3,673,133 A | 6/1972 | Schmidt | |
| 3,966,661 A * | 6/1976 | Feast et al. | 524/745 |
| 4,477,612 A * | 10/1984 | Boutsicaris | 524/76 |
| 4,537,915 A | 8/1985 | Oberle et al. | |
| 5,332,621 A | 7/1994 | Schmidt et al. | |
| 5,500,469 A | 3/1996 | Johnsen et al. | |
| 5,721,035 A | 2/1998 | Dunn | |
| 5,750,618 A | 5/1998 | Vogt et al. | |
| 5,872,189 A | 2/1999 | Bett et al. | |
| 6,391,952 B1 | 5/2002 | Bett et al. | |
| 6,579,940 B1 | 6/2003 | Dove | |
| 6,627,670 B2 | 9/2003 | Mork et al. | |
| 6,818,236 B2 | 11/2004 | Hill et al. | |
| 6,844,385 B1 | 1/2005 | Hagiwara et al. | |
| 6,870,019 B2 | 3/2005 | Kajiwara et al. | |
| 2002/0120025 A1 | 8/2002 | Balk et al. | |
| 2004/0030027 A1* | 2/2004 | Konno et al. | 524/493 |
| 2005/0038174 A1* | 2/2005 | Suzuki | 524/502 |
| 2005/0182159 A1* | 8/2005 | Udagawa et al. | 523/332 |

FOREIGN PATENT DOCUMENTS

| | | |
|---|---|---|
| CN | 1426317 A | 6/2003 |
| CN | 1483058 A | 3/2004 |
| DE | 1 056 364 | 4/1959 |
| DE | 1 213 984 | 12/1963 |
| DE | 2 150 872 | 4/1973 |
| EP | 0 062 989 A2 | 10/1982 |
| EP | 0 187 905 A2 | 7/1986 |
| EP | 0 559 150 A1 | 9/1993 |
| EP | 0 753 530 A2 | 1/1997 |
| EP | 1053258 A1 | 11/2000 |
| EP | 1063258 A2 | 12/2000 |
| EP | 1209192 A1 | 5/2002 |
| EP | 1215236 A2 | 6/2002 |
| EP | 1361247 A1 | 11/2003 |
| GB | 804 208 | 11/1958 |
| GB | 1 253 267 | 11/1971 |
| GB | 1 303 045 | 1/1973 |
| GB | 1 396 757 | 6/1973 |
| GB | 1 406 051 | 9/1975 |
| GB | 1406051 A * | 9/1975 |
| GB | 1 546 387 | 5/1979 |
| GB | 1546387 A * | 5/1979 |
| JP | S63-243147 | 10/1988 |
| JP | H11-092595 | 4/1999 |
| JP | H11-293590 | 10/1999 |
| JP | 2001-011126 A | 1/2001 |
| JP | 2002-226508 A | 8/2002 |
| JP | 2002-241412 A | 8/2002 |
| JP | 2003-531249 T2 | 10/2003 |
| JP | 2004-027135 A | 1/2004 |
| JP | 2004 196921 | 7/2004 |
| JP | 2004-300302 A | 10/2004 |
| KR | 2002-0093072 | 12/2002 |
| SU | 971852 A1 | 11/1982 |
| WO | WO 99/40122 A1 | 8/1999 |
| WO | WO 00/11980 A1 | 3/2000 |
| WO | WO 01/30876 A2 | 5/2001 |
| WO | WO 01/80916 A2 | 11/2001 |
| WO | WO 02/18490 A2 | 3/2002 |
| WO | WO 02/38640 A2 | 5/2002 |
| WO | WO 02/50177 A2 | 6/2002 |
| WO | WO 03/006513 A1 | 1/2003 |

(Continued)

OTHER PUBLICATIONS

D.C. Blackley, High Polymer Latices, vol. 1, 1966, pp. 69-89.

(Continued)

*Primary Examiner* — Kelechi Egwim
(74) *Attorney, Agent, or Firm* — Knobbe Martens Olson & Bear LLP

(57) ABSTRACT

The present invention refers to a polymer latex made by free-radical polymerization comprising polymer particles containing structural units derived from at least one conjugated diene monomer and at least one aromatic vinyl monomer, whereby no vinyl pyridine is used in the polymerization and the polymer latex is polymerized in the presence of at least one chain transfer agent having the general formula RSH, wherein R is a linear alkyl group having 3 to 20 carbon atoms and the dried latex polymer has a Mooney viscosity measured according to DIN 53 523 of 85 to 155, as well as to articles made there from.

20 Claims, No Drawings

FOREIGN PATENT DOCUMENTS

| WO | WO 03/062307 A2 | 7/2003 |
| WO | WO 03/066729 A2 | 8/2003 |

OTHER PUBLICATIONS

Encyclopedia of Polymer Science and Engineering, vol. 14, John Wiley & Sons, pp. 719-746 (1985).

Maarse, et al., "Handbuch der Aroma Forschung," Akademie Verlag, Berlin, 1981.

Schnetger, J., "Lexikon der Kautcshuktechnik, 2. Auglage," 2.edition, 1991 Huthig Buch Verlag, Heidelberg.

D.C. Blackley, in High Polymer Latices vol. 1, 1996; pp. 73-86.

D.C. Blackley in *Polymer Latices—Science and Technology*, Second Edition, Chapman & Hall, New York (1997), pp. 238-246.

Hawley's Condensed Chemical Dictionary, 2002, John Wiley & Sons Inc., 14$^{th}$ Edition.

Sakota, K. and Okaya, T. 1977 "Electrolyte stability of carboxylated latexes prepared by several polymerization processes" *J Applied Polymer Science* 21:1025-1034.

*No-Fume Ld* v. *Frank Pitchford & Co. Ltd.* (May 29, 1935) in Reports of Patent, Design and Trademark Cases, vol. LII, No. 7: pp. 231-253.

* cited by examiner

LATEX WITH REDUCED ODOR

CROSS-REFERENCE TO RELATED APPLICATIONS

This application claims the benefit of U.S. Provisional Application No. 60/837,013, filed Aug. 10, 2006, the disclosure of which is hereby incorporated by reference in its entirety.

FIELD OF THE INVENTION

The present invention is directed to a latex with reduced odor which can be converted to a latex foam, latex sealings or latex film having reduced odor as well. Moreover, the present invention is directed to a method for making the same.

BACKGROUND OF THE INVENTION

In the art there is an increasing demand for latices having reduced odor. This is relevant for many applications, e.g., the use of latex as latex foam used for pillows or latex sealings used for conserving food.

All of these applications have in common that the latex used has to be low in odor because otherwise the odor of said product is not acceptable to a customer.

However, a latex and articles manufactured therefrom have to fulfill specific mechanical and physical properties. All of these properties are obtained by adjusting the ratio of monomers used in polymerization to the specific properties which should be obtained. Additionally specific additives are present during polymerization which for instance improve the physical properties of the product. In case of latex foams the latex has to provide particular physical properties suitable for processing conditions commonly used. The same applies to sealings made of latex because, for instance in manufacturing cans the equipment used for filling cans cannot be adjusted easily to specific requirements of any latex.

In polymerization commonly tert-dodecyl mercaptan is used as regulator. By adding said regulator the specific mechanical and physical properties of the latex are adjusted. However, mercaptans are sulfur-containing compounds and said mercaptans have a very bad smell since they stink.

Mercaptans used as regulator in polymerization reactions also have a very high boiling point so that it is not possible to remove said regulators from the obtained latex by customary separation methods. Mercaptans used as regulators in the polymerization reaction maintain in the final product.

Besides the bad smell of tert-dodecyl mercaptan the final product is not unhealthy because of said compound.

However, there are applications where the final product has to be free from smell.

In the U.S. Pat. No. 6,818,236 B2 an SBR latex used for manufacturing chewing gum is disclosed. The chewing gum SBR is polymerized by using styrene and 1,3-butadiene as monomers. The copolymerization can be conducted in the presence of n dodecyl mercaptan as chain transfer agent to reduce the molecular weight of the SBR. Moreover, the amount of n dodecyl mercaptan used should be low enough that it is totally depleted by the time the copolymerization is short-stopped.

Short-stopping of the monomer conversion is conducted at about 65% to about 70% conversion rate. Preferably a reducing agent is used for short-stopping the monomer conversion.

The Example of U.S. Pat. No. 6,818,236 is directed to an experimental SBR latex. N-dodecyl mercaptan was charged into the reactor as chain transfer agent. After recovering and drying the SBR latex the obtained latex film had a Mooney viscosity of 80.

According to the teaching of U.S. Pat. No. 6,818,236 the synthesized SBR is low of odor and low in taste because of the fact that it is essentially void of sulfur-containing compounds. This means that according to the teaching of said U.S. patent the amount of sulfur-containing chain transfer agents has to be minimized whereas it is advantageous to short-stop the polymerization reaction at a very low conversion rate. The freedom from odor and taste is not correlated with the use of n-dodecyl mercaptan as chain transfer agent. A person skilled in the art can derive from the teaching of U.S. Pat. No. 6,818,236 only that the amount of sulfur-containing chain transfer agent has to be minimized. U.S. Pat. No. 6,818,236 also refers to a completely different technological background since a latex used for soft chew applications has to have completely different properties compared with a latex used for manufacturing latex foams or latex sealings.

Moreover, a latex used for manufacturing latex foams or latex sealings should preferably have a high solids content and a broad particle size distribution. Furthermore, a solid rubber cannot be processed without using organic solvents, which contribute to VOC and may cause odor.

The latex for the manufacture of latex foam and can sealing may contain a suitable reinforcing latex beneath a base latex known to the persons skilled in the art.

J. Schnetger: "Lexikon der Kautschuktechnik", 2.edition, 1991 Hüthig Buch Verlag, Heidelberg, only makes a general reference to the suitability of styrene butadiene latices (SBR) for the production of foam rubber. But there is no information derivable with respect to the properties of the latex polymer like Mooney viscosity or which chain transfer agents were used in the preparation of the latex.

GB-A 1546387 discloses the use of a styrene butadiene latex the latex polymer having a Mooney viscosity of 100 to 150 in a sealant composition for food can application. But this prior art reference is totally silent with respect to any odor properties of the latex, nor does it disclose which chain transfer agent was used.

Thus, the technical problem underlying the present invention is the provision of a superior latex useful for manufacturing latex foam, latex sealings or latex films, whereby the obtained latex is low in odor and can be used for manufacturing the aforementioned articles without changing further properties of the latex.

GB-A 1406051 relates to a styrene/butadiene/vinyl pyridine latex, the latex polymer having a Mooney viscosity of 50 to 150, preferably of 17 to 130 used in adhesive compositions for bonding fiber cords to rubber in tires. Vinyl pyridine is the essential component in the latex polymer in order to achieve the desired properties. Although the reference mentions t-dodecylmercaptan and n-dodecylmercaptan as suitable molecular weight regulators in the examples t-dodecylmercaptan is used. Furthermore odor is no problem for the disclosed use of the latex as can be seen from the copolymerization of vinyl pyridine which is a monomer having an unpleasant intensive odor. Thus, GB-A 1406051 can not give any incentive that by using n-alkylmercaptans as chain transfer agent in the preparation of a polymer latex the odor of the resulting latex can be reduced.

SUMMARY OF THE INVENTION

The technical problem underlying the present invention is therefore surprisingly solved by a polymer latex made by free-radical polymerization comprising polymer particles containing structural units derived from at least one conjugated diene monomer and at least one aromatic vinyl monomer, whereby no vinyl pyridine is used in the polymerization and the polymer latex is polymerized in the presence of at least one chain transfer agent having the general formula RSH, wherein R is a linear alkyl group having 3 to 20 carbon atoms and the dried latex polymer has a Mooney viscosity measured according to DIN 53 523 of 85 to 155.

The Mooney viscosity is measured according to DIN 53 523. In order to measure the Mooney viscosity the polymer latex is dried and subsequently added to the viscosimeter. The measurement of the viscosity is conducted at a temperature of 100° C.

In a preferred embodiment the conjugated diene monomer is selected from the group consisting of 1,3-butadiene, 2-chloro-1,3-butadiene, isoprene, conjugated straight-chain and branched pentadienes and hexadienes and combinations thereof.

In a further preferred embodiment the aromatic vinyl monomer is selected from the group consisting of styrene, α-methyl styrene, 4-methyl-styrene, α-chloro styrene, 4-chloro styrene, divinylbenzene, 4-methoxy-3-methylstyrene, 3,4-dimethyl-α-methylstyrene and combinations thereof.

Preferably the latex comprises 5-40 wt-% aromatic vinyl monomer based on the total weight of the polymer particles present in the latex. In a further preferred embodiment 10-35 wt-% aromatic vinyl monomer, even more preferred 15-35 wt-% aromatic vinyl monomer and most preferred 20-30 wt-% aromatic vinyl monomer based on the total weight of the polymer particles are present in the latex.

In a further preferred embodiment the latex comprises 95-60 wt-% conjugated diene monomer based on the total weight of polymer particles present in the latex. In a further preferred embodiment 90-65 wt-% conjugated diene monomer, even more preferred 85-65 wt-% conjugated diene monomer and most preferred 80-70 wt-% conjugated diene monomer based on the total weight of the polymer particles are present in the latex.

In addition that in the latex polymer no structural units derived from vinyl pyridine are present, the latex polymer preferably does not comprise structural units based on acrylic acid and preferably does not comprise structural units based on (α,β)-unsaturated monocarboxyclic acids. In a further preferred embodiment the latex polymer does not comprise structural units based on unsaturated monocarboxyclic acids and/or does not comprise carboxylic groups. Preferably, the aforementioned structural units are not present within the polymer chains of the polymerized latex particles.

In a further preferred embodiment the linear alkyl group R of the chain transfer agent RSH is selected form an alkyl group having 3, 4, 5, 6, 7, 8, 9, 10, 11, 12, 13, 14, 15, 16, 17, 18, 19 or 20 carbon atoms, whereby n-octyl mercaptan, n-decyl mercaptan and n-dodecyl mercaptan are preferred, n-decyl mercaptan and n-dodecyl mercaptan are more preferred and n-dodecyl mercaptan is preferably preferred as chain transfer agent.

The solid content of the latex is preferably of from 55% to 85%, even more preferred of from 60% to 80%, and most preferred of from 60% to 75%.

In a further preferred embodiment the Mooney viscosity is 90 to 155, preferably 90 to 150, more preferably 95 to 145, most preferred 100 to 145, even more preferred 105 to 145, preferably 105 to 140, even more preferred 110 to 135, preferably 115 to 130 and most preferred 120 to 130.

The polymer particles preferably have a single glass transition temperature (Tg) from −75 to −25° C., more preferably from −60 to −40° C. measured according to the differential scanning calorimetry (DSC DIN53765).

For the polymerization of the latex the required amounts of monomers are preferably initially introduced and emulsified in the aqueous phase by continuous vigorous stirring. After a matched amount of initiator is introduced to start a batch reaction remaining amounts of initiator may be metered into the reactor later on. It is also possible to add the monomers in a feed process and emulsify them in the aqueous phase by continuous vigorous stirring. Appropriate amounts of initiator and emulsifier are also added in the feed process. Monomer can be added in the same manner also as an aqueous emulsion.

The polymer latex is preferably stabilized using the customary fatty acid soaps and/or rosin soaps which lead to dispersions having increased pH values of between 8 and 12, depending on the alkalinity of these emulsifiers. The polymerization reaction can be conducted at these pH values. The content of emulsifier is preferably between 0.5 and 8 wt-%, based on the total amount of monomers and even more preferred of from 2 to 7 wt-%.

Preferably 0.01 to 2 wt-% of free radical initiators based on the total amount of monomers present are used for starting the polymerization reaction. Preferably all soluble and all water-soluble azo initiators, peroxides, hydroperoxides and peroxidisulfates are suitable for this purpose. In the polymerization at relatively high temperatures peroxidisulfates are preferably used. In a further preferred embodiment polymerization can be effected at low temperature by using peroxides and hydroperoxides in combination with a suitable reducing agent. Suitable reducing agents are, for example, sodium formaldehyde sulfoxylate and ascorbic acid derivatives, preferably also in combination with an iron-II-salt. The polymerization temperature preferably is between 0° C. and 90° C. depending on the initiator system. Preferably the temperature is between 60° C. and 90° C. when a peroxidisulfate initiator is used, and between 0° C. and 50° C. when a redox initiator system is used for starting the polymerization reaction.

Preferably the median particle diameter of the volume distribution of the obtained latex after polymerization is between 40 and 750 nm, preferably between 40 and 200 nm measured according to the capillary hydrodynamic fractionation method (CHDF).

The increase in particle size can preferably be achieved by freeze agglomeration, mechanical agglomeration, and chemical agglomeration, i.e. addition of electrolyte, hydrophilic polymer or colloids. After such treatment the median particle diameter of the volume distribution is preferably between 200 nm and 750 nm.

The surface tension of the final polymer latex is preferably in the range from 30 to 50 mN/m, preferably the viscosity of the obtained polymer latex is below 2500 mPas and the pH value of the obtained latex preferably is in the range of 8 to 12.

The aqueous rubber dispersion according to the present invention is also used for making a latex foam, sealings etc.

DETAILED DESCRIPTION OF THE PREFERRED EMBODIMENT

Thus, the present invention relates also to a process for making a latex foam by a) compounding the polymer latex of the present invention into a foamable and vulcanizable latex compound;

b) foaming the vulcanizable latex compound;

c) filling the foam obtained in step b) into a mold of desired shape;

d) stabilizing the foam structure;

e) vulcanizing the foam; and f) removing the vulcanized latex foam from the mold.

In order to compound the rubber dispersion of the present invention into a foamable and vulcanizable latex compound the dispersion is preferably mixed with emulsifiers, thickening agents and a vulcanizing paste as known by a person skilled in the art.

Emulsifiers are added to the rubber dispersion of the present invention in order to increase its mechanical and chemical stability and to facilitate foaming of the rubber dispersion. Anionic, cationic or non-ionic surfactants can be chosen depending on the process requirements whereby anionic surfactants are preferred for foaming applications. Preferred anionic surfactants are fatty acid soaps, fatty alcohol sulfonates and alkylaryl or aralkyl sulfonates, succinates and amido sulfosuccinates. Particularly preferred are alkali metal and ammonium salts of fatty acids and rosin acids and combinations thereof, most preferred are alkali metal salts of fatty acids and rosin acids and combinations thereof.

The vulcanization paste, preferably employed in the foaming process of the present invention, comprises sulfur or sulfur compounds, zinc oxide, vulcanization accelerators and customary additives, like antiaging agents or surfactants. Examples of suitable sulfur compounds are described in D. C. Blackley, High Polymer Latices, Vol. 1 1966, pages 69 72.

Suitable vulcanization accelerators are described in D. C. Blackley, High Polymer Latices, Vol. 1 1966, pages 73-86, and in Encyclopedia of Polymer Science and Engineering, Vol. 14, John Wiley & Sons, pages 719-746 (1985).

Suitable antiaging agents are described in D. C. Blackley, High Polymer Latices, Vol. 1 1966, pages 86-89.

The vulcanization pastes are suitably applied in amounts of 3-15 weight percent, preferably 4-12 weight percent, and most preferred 4-10 weight percent, based on the weight of the solids of the rubber dispersion.

The thus obtained foamable and vulcanizable latex compound can be processed by any process known to the person skilled in the art for making foamed articles.

Preferably, the foamable and vulcanizable latex compound is processed by the Dunlop process or the Talalay process, whereby the Dunlop process is most preferred.

In case the foamed article is prepared according to the Dunlop process an appropriate amount of gelling agent is added to the readily mixed vulcanizable latex compound. The quantity of the gelling agent will depend on the desired pot life of the foamable compound which should be advantageously adjusted to be 5-20 minutes. Preferably according to the Dunlop process an aqueous sodium silicofluoride dispersion is used as gelling agent. The compound can be first foamed and then the gelling agent is added and foaming is continued to obtain a homogeneous distribution of the gelling agent within the foam, the desired foam density, as well as the desired foam structure. Alternatively, after the addition of the gelling agent the compound is foamed immediately using mechanical means in a way to prepare a stable foam of the desired foam density. Thereafter the foamed latex compound is filled into the mold of desired shape. Usually closed molds are used but in some cases, for example shoe soles, open molds can be employed.

According to the Dunlop process the foam structure in the mold is stabilized by gelling the latex foam at elevated temperatures. Thereafter the molds are heated, in case of closed molds preferably in saturated steam, to vulcanize the latex foam. After vulcanization the latex article is removed from the mold and if necessary washed and dried.

Alternatively the Talalay process may be employed to prepare the latex foams according to the present invention. In the Talalay process the vulcanizable latex compound is first prefoamed to give a foam with relatively high density and then poured into the molds. The closed molds are then evacuated whereby the latex compound foams to the finally desired density due to the vacuum applied and thus fills the mold completely. By cooling the mold to approximately −30° C. the foam structure is stabilized. Thereafter carbon dioxide is lead into the mold to pressurize the mold whereby at the same time the pH of the frozen foamed latex compound is lowered resulting in gelling. The foam then may be thawed without changing its structure and the mold is heated in stages up to 110° C. to vulcanize the latex foam. After complete vulcanization the article is removed from the mold, optionally washed and dried.

The foamed articles of the present invention may be used for mattresses, pillows, neck rests, toppers, shock absorbers, shaped parts of shoes, shoe inside soles, garments padding, protectors for sportswear, athletic implements, bike saddles, motorbike saddles, furniture upholstery material, bumpers, automotive dashboards and carpets.

A further object of the present invention is a method for making a latex sealing by:

a) compounding the polymer latex of the present invention, b) applying the latex compound to a metal substrate (like for example can ends), and c) drying and vulcanizing the compound.

The can sealing compound should have no impact on the odor and flavor properties of the contents (food and drinks) of the can and serves to protect the contents from gases (oxygen) and bacterial intrusion from outside as well as gas loss (carbon dioxide) from inside. The compound has to be mechanically stable during the compounding and processing and has to exhibit good adhesion properties on metal during the can closing and life cycle of the can. One example of a can sealing compound is given below:

| CAN SEALING COMPOUND | | |
|---|---|---|
| Compounding ingredients | | Amount (parts by weight) |
| a. High solid SBR latex, 67% | | 149.3 |
| b. demineralized water | | 20.0 |
| Lavoral 150, 20%(1) | | 5.0 |
| c. china clay | | 120.0 |
| baryte | | 30.0 |
| d. vulcanisation paste: | | |
| Zincoxide RS(2) | | 8.0 |
| Vulkacit Thiuram(3) | | 2.0 |
| colloidal sulfur 95 | 26.0 | 2.0 |
| Tamol NN 9104 100%(4) | | 1.3 |
| demineralized water | | 12.7 |
| e. Vulkasil A 1 dispersion, 30%(5) | | 50.0 |
| f. Walocel MT 4000 GB, 5%(6) | | 50.0 |

Manufactures:
(1) Lavoral 150    Bayer Chemicals, Leverkusen
(2) Zincoxide RS    Grillo Werke AG, Goslar
(3) Vulkacit Thiuram    Bayer MaterialScience AG, Leverkusen
(4) Tamol NN 9104    BASF
(5) Vulkasil A 1    Bayer MaterialScience AG, Leverkusen
(6) Walocel MT 4000    Wolff Walsrode AG, Walsrode The ingredients are added to the compound in the mentioned sequence a-f under continuous stirring with a low shear equipment.

Moreover, the present invention is directed to an article comprising an aforementioned latex sealing and/or latex film obtained from the aforementioned latex. The article preferably is selected from can sealings and adhesives.

Surprisingly the latex of the present invention leads to polymer latices and articles manufactured thereof which are very low in odor. Surprisingly the mechanical properties of the latex and the products manufactured therefrom are not affected. The latex can be used in any customarily used manufacturing process.

The present invention is exemplified by the following examples.

EXAMPLES

Measuring Methods

The following measuring methods were used to determine the physical parameters of the rubber dispersion of the present invention, as well as of the latex foam. The glass transition temperature Tg, the particle size distribution PSD, the odor and the mechanical data of the foam are measured as follows. All data given within the entire specification including the claims are measured in accordance with the detailed description given below. Thus the description of the measuring methods is not restricted to the examples only.

1. Glass Transition Temperature

The glass transition temperature was measured according to DIN 53765. A traditional DSC system is used (Perkin Elmer Pyris 6 DSC). The sample is dropped into a pan. Then the sample and the empty reference pan are placed into the DSC oven. The DSC oven is closed and the temperature program for the sample preparation is started. The program starts at 30° C. The heating rate is 20 K/min. The maximum temperature is 160° C. which is held for 10 min. The sample is cooled down to −20° C. and again heated to 20° C. Afterwards the DSC measuring is started. The temperature program starts at −70° C. The heating rate is 20 K/min. The maximum temperature is 180° C. Finally the oven is cooled to room temperature again. The raw data is collected and processed with the Pyris TA Manager Software.

2. Particle Size Distribution

The particle size distribution is measured on the Particle Size Distribution Analyzer from PolymerLaboratories. The diluted latex sample under investigation and a small molecule marker solution are introduced into the system via a two position, electrically actuated valve, such that the eluent flow is not interrupted. The sample components are separated by an HDC mechanism in a "cartridge", and their concentration is measured by a UV detector. The system is calibrated using a series of particle size standards.

3. Mooney-Viscosity

The Mooney-viscosity is measured according to the DIN 53523. For the coagulation of the latex 250 g of the latex with 30% total solids are required. 50 ml of sodium chloride solution (25%) is added to the stirred latex. Then 250 ml of a Wingstay L/Ethanol solution (0.75%) are added within 30 seconds. Furthermore, 10 ml of sulfuric acid (18%) are dropped into the latex. The coagulate and the serum is filtered through a 200 µm Monodur cloth. The residual water is squeezed out and the polymer clump is reduced to small pieces. Those are washed with 1 l of demineralised water. The polymer is again squeezed, reduced into small pieces (1-2 cm) and dried for 2 h at 105° C. The dried rubber pieces are then pressed free of blow holes and cut into the specimen. The measurement is performed at 100° C. with a previous heating time of 1 min and a measuring time of 4 min and a rotor speed of 2 rpm (large rotor).

4. Informal Sensory Test

Samples are sensory evaluated in an informal way by experienced staff not having obtained on forehand any information about the samples. Odor scores are given using a scale from 1-5 (0=no odor, 1=just noticeable, 5=very strong).

5. GC Sniffing Test

The volatiles are extracted from the sample by a combined steam distillation and extraction method (so-called Likens and Nickerson method, see "Handbuch der Aroma Forschung" H. Maarse and R. Belz, Akademie Verlag, Berlin, 1981).

25 g of sample is mixed with 500 ml water and anti-foam (1 ml Dow Corning® RD) is added. Extraction time is 2 hours. As solvent a mixture of pentane and ether (2:1) is used. The solvent phase is dried and concentrated on a water bath to 0.5 ml using a Vigreux column.

Concentrated extracts are analysed with GC-sniff-MS (Agilent 5973 GC-MS). 1.5 µl extract is injected splitless on a 30 m capillary column DB-5MS. Diameter 0.25 mm, film 1 µm. Oven temperature program 0° C. (1 min), 10° C./min to 320° C. (2 min). The end of the column is connected to a splitter which leads approx 50% of the effluent to a sniff port and the other part to the MS detector. At the sniff port the effluent is mixed with humidified air.

The sniffing is performed by one person who notes the descriptions of the odors observed at the port with the corresponding retention times (no chromatograms are shown during sniffing). The odors are scored from weak to strong (0=no odor, 1=just noticeable, 5=very strong).

6. Mechanical Data of the Latex Foam 389.6 g of the aqueous reinforced rubber dispersion were weighted together with 10.8 g potassium oleate as 17.5% aqueous solution, 24.5 g of sodium carboxyl methyl cellulose solution 2.5% in water (Blanose NA-CMC Type 12M 31P available from Hercules GmbH) and 36.8 g of a 60% solid vulcanization paste Suprotex UGB, obtainable from Weserland Textilchemie, into the bowl of a Hobart Planetary Mixer (Type N50). In a separate vessel 23.1 g of 25% sodium silicofluoride dispersion in water was weighted. The aqueous reinforced rubber dispersion in the mixing bowl was foamed using the Hobart Planetary Mixer until a wet foam density of about 112 g/l was achieved that corresponds to a dry foam density of about 75 g/l.

Thereafter the sodium silicofluoride dispersion gelling agent was added and mixing was continued for 2 min to achieve homogeneous distribution of the gelling agent within the foam and a homogeneous foam structure.

The latex compound thus obtained from each composition according to the examples was filled into a 290 mm×290 mm×28 mm mold. The mold was sealed and its content vulcanized at 100° C. with saturated steam for 20 min. The vulcanized foam was removed from the mold, washed and dried for 90 min at 120° C. in a forced circulation oven.

Thereafter the samples were conditioned and measured as indicated above with respect to the measuring methods. The actual foam density was measured for normalizing the hardness according to the above equation for a foam density of 75 g/dm$^3$.

The testing is performed on the tensile testing model Zwick/Z 010 from Zwick.

6.1. Elongation at Break and Tear Strength

The elongation at break is measured in accordance with DIN EN ISO 1798. Deviating from this norm the samples are stored for 16 hours at room temperature The dimension of the sample (Type A) and the testing speed (500 mm/min) remain unchanged.

6.2. Hardness

The hardness of the latex foam is measured in accordance with DIN EN ISO 2439, following the method according to process A—determination of indentation hardness index. Conditioning of the samples was performed as follows.

This method was followed with the following exceptions. After preparation the samples were stored at room temperature for 16 h. The sample dimensions have been altered to have a square shape with an edge length of 280±2 mm and a sample thickness of 30±2 mm.

The hardness is normalized to a hardness at 75 g/dm³ according to the following equation:

$$A_{75} = \frac{148{,}239}{0{,}0099\sigma^2 + 2{,}1575\sigma - 69{,}261} \cdot A_x$$

whereby $A_x$ is the measured hardness as obtained according to the method described above and $\sigma$ is the actual density of the measured foam given in g/dm³.

6.3. Hysteresis

Hysteresis is measured in accordance with DIN EN ISO 3386 with the following alterations. Square shape with an edge length of 60±2 mm and a thickness of 30±2 mm.

Hysteresis is measured on two samples instead of three, and the samples are stored for 16 h at room temperature.

Comparative Example 1

Polymer Latex with Tert-dodecyl Mercaptan as Modifier

The reactor is charged with a solution of 29.3 g potassium oleate, 3.75 g potassium chloride and 0.73 g naphthalene sulfonic acid formaldehyde condensate, sodium salt in 1405.5 g deionized water. 324.8 g styrene and 1.64 g tert-dodecyl mercaptan are added. The reactor is pressed with nitrogen and evacuated. 791.0 g butadiene are added. The mixture is cooled to 15° C. 0.56 g p-menthane hydroperoxide in 34.5 g styrene is added, followed by 34.5 g deionized water. A solution of 0.59 g sodium formaldehyde sulfoxylate, 0.12 g ethylenediamine tetraacetic acid and 0.06 g iron(II) sulfate heptahydrate in 33.18 g deionized water is added, followed by 34.5 g deionized water. The reactor temperature is increased to 50° C. within 3 hours and then kept constant. Then a solution of 0.29 g p-menthane hydroperoxide and 1.68 g potassium oleate in 23.0 g deionized water is added at time 3 hours for two hours at a feeding rate of 12.49 g/h. The reaction is stopped at a conversion of 60 to 80%. At the end of the polymerisation a solution of 0.61 g potassium chloride, 6.29 g naphthalene sulfonic acid formaldehyde condensate, sodium salt and 0.42 g N,N-diethylhydroxyamine in 32.8 g deionized water is added, followed by 23.0 g deionized water.

A solution of 1.16 g polyethylene oxide (prepared according to the teaching of DE 1 213 984) and 0.06 g ethylenediamine tetraacetic acid in 2.54 g deionized water is added, followed by 46.0 g deionized water. After 3 hours a solution of 4.12 g potassium oleate, 0.03 g potassium chloride and 0.36 g naphthalene sulfonic acid formaldehyde condensate, sodium salt in 21.7 g deionized water, followed by 46.0 g of deionized water. Finally the latex has a solids content of ca. 31%.

The latex is then concentrated under stirring and nitrogen atmosphere in a water bath at 70° C. to a solid content of ca. 67%.

Comparative Example 2

Polymer Latex without Chain Transfer Agent (Modifier)

The reactor is charged with a solution of 26.8 g potassium oleate, 3.75 g potassium chloride and 0.73 g naphthalene sulfonic acid formaldehyde condensate, sodium salt in 1399.8 g deionized water. 324.8 g styrene are added. The reactor is pressed with nitrogen and evacuated. 791.0 g butadiene are added. The mixture is cooled to 15° C. 0.56 g p-menthane hydroperoxide in 34.5 g styrene is added, followed by 34.5 g deionized water. A solution of 0.59 g sodium formaldehyde sulfoxylate, 0.12 g ethylenediamine tetraacetic acid and 0.06 g iron(II) sulfate heptahydrate in 33.18 g deionized water is added, followed by 34.5 g deionized water. The reactor temperature is increased to 25° C. within 3 hours and then kept constant. Then a solution of 0.76 g p-menthane hydroperoxide and 4.19 g potassium oleate in 28.8 g deionized water is added at time 1 hour for 4 hours at a feeding rate of 8.44 g/h. The reaction is stopped at a conversion of 60 to 80%. At the end of the polymerisation a solution of 0.61 g potassium chloride, 6.29 g naphthalene sulfonic acid formaldehyde condensate, sodium salt and 0.42 g N,N-diethylhydroxyamine in 32.8 g deionized water is added, followed by 23.0 g deionized water.

A solution of 1.16 g polyethylene oxide (prepared according to the teaching of DE 1 213 984) and 0.06 g ethylenediamine tetraacetic acid in 2.54 g deionized water is added, followed by 46.0 g deionized water. After 3 hours a solution of 4.12 g potassium oleate, 0.03 g potassium chloride and 0.36 g naphthalene sulfonic acid formaldehyde condensate, sodium salt in 21.7 g deionized water, followed by 46.0 g of deionized water. Finally the latex has a solids content of ca. 30%.

The latex is then concentrated under stirring and nitrogen atmosphere in a water bath at 70° C. to a solid content of ca. 67%.

Example 1

Polymer Latex with n-dodecyl Mercaptan as Modifier

The reactor is charged with a solution of 29.3 g potassium oleate, 3.75 g potassium chloride and 0.73 g naphthalene sulfonic acid formaldehyde condensate, sodium salt in 1405.5 g deionized water. 324.8 g styrene and 1.64 g n-dodecyl mercaptan are added. The reactor is pressed with nitrogen and evacuated. 791.0 g butadiene are added. The mixture is cooled to 15° C. 0.56 g p-menthane hydroperoxide in 34.5 g styrene is added, followed by 34.5 g deionized water. A solution of 0.59 g sodium formaldehyde sulfoxylate, 0.12 g ethylenediamine tetraacetic acid and 0.06 g iron(II) sulfate heptahydrate in 33.18 g deionized water is added, followed by 34.5 g deionized water. The reactor temperature is increased to 50° C. within 3 hours and then kept constant. Then a solution of 0.29 g p-menthane hydroperoxide and 1.68 g potassium oleate in 23.0 g deionized water is added at time 3 hours for two hours at a feeding rate of 12.49 g/h. The reaction is stopped at a conversion of 60 to 80%. At the end of the polymerisation a solution of 0.61 g potassium chloride, 6.29 g naphthalene sulfonic acid formaldehyde condensate, sodium salt and 0.42 g N,N-diethylhydroxyamine in 32.8 g deionized water is added, followed by 23.0 g deionized water.

A solution of 1.16 g polyethylene oxide (prepared according to the teaching of DE 1 213 984) and 0.06 g ethylenediamine tetraacetic acid in 2.54 g deionized water is added, followed by 46.0 g deionized water. After 3 hours a solution of 4.12 g potassium oleate, 0.03 g potassium chloride and 0.36 g naphthalene sulfonic acid formaldehyde condensate, sodium salt in 21.7 g deionized water, followed by 46.0 g of deionized water. Finally the latex has a solids content of ca. 31%.

The latex is then concentrated under stirring and nitrogen atmosphere in a water bath at 70° C. to a solid content of ca. 67%.

Example 2

Polymer Latex with n-dodecyl Mercaptan as Modifier

The reactor is charged with a solution of 29.3 g potassium oleate, 3.75 g potassium chloride and 0.73 g naphthalene sulfonic acid formaldehyde condensate, sodium salt in 1405.5 g deionized water. 324.8 g styrene and 2.46 g n-dodecyl mercaptan are added. The reactor is pressed with nitrogen and evacuated. 791.0 g butadiene are added. The mixture is cooled to 15° C. 0.56 g p-menthane hydroperoxide in 34.5 g styrene is added, followed by 34.5 g deionized water. A solution of 0.59 g sodium formaldehyde sulfoxylate, 0.12 g ethylenediamine tetraacetic acid and 0.06 g iron(II) sulfate heptahydrate in 33.18 g deionized water is added, followed by 34.5 g deionized water. The reactor temperature is increased to 50° C. within 3 hours and then kept constant. Then a solution of 0.29 g p-menthane hydroperoxide and 1.68 g potassium oleate in 23.0 g deionized water is added at time 3 hours for two hours at a feeding rate of 12.49 g/h. The reaction is stopped at a conversion of 60 to 80%. At the end of the polymerisation a solution of 0.61 g potassium chloride, 6.29 g naphthalene sulfonic acid formaldehyde condensate, sodium salt and 0.42 g N,N-diethylhydroxyamine in 32.8 g deionized water is added, followed by 23.0 g deionized water.

A solution of 1.16 g polyethylene oxide (prepared according to the teaching of DE 1 213 984) and 0.06 g ethylenediamine tetraacetic acid in 2.54 g deionized water is added, followed by 46.0 g deionized water. After 3 hours a solution of 4.12 g potassium oleate, 0.03 g potassium chloride and 0.36 g naphthalene sulfonic acid formaldehyde condensate, sodium salt in 21.7 g deionized water, followed by 46.0 g of deionized water. Finally the latex has a solids content of ca. 31%. The latex is then concentrated under stirring and nitrogen atmosphere in a water bath at 70° C. to a solid content of ca. 67%.

Example 3

Polymer Latex with n-dodecyl Mercaptan as Modifier

The reactor is charged with a solution of 26.8 g potassium oleate, 3.75 g potassium chloride and 0.73 g naphthalene sulfonic acid formaldehyde condensate, sodium salt in 1399.8 g deionized water. 324.8 g styrene and 3.28 g n-dodecyl mercaptan are added. The reactor is pressed with nitrogen and evacuated. 791.0 g butadiene are added. The mixture is cooled to 15° C. 0.56 g p-menthane hydroperoxide in 34.5 g styrene is added, followed by 34.5 g deionized water. A solution of 0.59 g sodium formaldehyde sulfoxylate, 0.12 g ethylenediamine tetraacetic acid and 0.06 g iron(II) sulfate heptahydrate in 33.18 g deionized water is added, followed by 34.5 g deionized water. The reactor temperature is increased to 25° C. within 3 hours and then kept constant. Then a solution of 0.76 g p-menthane hydroperoxide and 4.19 g potassium oleate in 28.8 g deionized water is added at time 1 hour for 4 hours at a feeding rate of 8.44 g/h. The reaction is stopped at a conversion of 60 to 80%. At the end of the polymerisation a solution of 0.61 g potassium chloride, 6.29 g naphthalene sulfonic acid formaldehyde condensate, sodium salt and 0.42 g N,N-diethylhydroxyamine in 32.8 g deionized water is added, followed by 23.0 g deionized water.

A solution of 1.16 g polyethylene oxide (prepared according to the teaching of DE 1 213 984) and 0.06 g ethylenediamine tetraacetic acid in 2.54 g deionized water is added, followed by 46.0 g deionized water. After 3 hours a solution of 4.12 g potassium oleate, 0.03 g potassium chloride and 0.36 g naphthalene sulfonic acid formaldehyde condensate, sodium salt in 21.7 g deionized water, followed by 46.0 g of deionized water. Finally the latex has a solids content of ca. 30%.

The latex is then concentrated under stirring and nitrogen atmosphere in a water bath at 70° C. to a solid content of ca. 67%.

Comparative Example 1-2 and Examples 1-3

TABLE 1

|  | Example Measurements | | | | |
| --- | --- | --- | --- | --- | --- |
|  | CE1 | CE2 | E1 | E2 | E3 |
| Latex Informal Sensory Test | | | | | |
| Sulphur-like odor GC Sniffing | 4 | 0 | 0 | 1 | 0 |
| Sulphur-like odor tr = 17.6 | 3 | 0 | 0 | 1 | 1 |
| Sulphur-like odor tr = 19.0 Polymer | 4 | 0 | 0 | 1 | 0 |
| Mooney viscosity (ML1 + 4) Foam | 131 | 157 | 145 | 133 | 101 |
| Elongation at break [%] | 155 | 147 | 154 | 154 | 199 |
| Tear Strength [N/mm$^2$] | 0.039 | 0.030 | 0.035 | 0.037 | 0.051 |
| Hardness [N] | 87 | 88 | 83 | 89 | 86 |
| Hysteresis [N/mm$^2$] | 19.2 | 19.9 | 18.3 | 17.6 | 17.8 |

Comparative example 1 shows suitable polymer and foam but disturbing odor properties. Moreover, comparative example 2 shows insufficient polymer and foam but the desired odor properties.

In contrast thereto, the aqueous rubber dispersions according to the present invention show the desired odor properties, i.e. the odor intensity is equal or lower than 1. At the same time the Mooney viscosity is in the desired region, namely below 155. The foam properties are matching the expectations as well.

What is claimed is:

1. A polymer latex made by free-radical polymerization comprising polymer particles comprising:
    (a) structural units derived from:
        at least one conjugated diene monomer, and
        at least one aromatic vinyl monomer, and
    (b) at least one chain transfer agent having the general formula RSH, wherein R is a linear alkyl group having 3 to 20 carbon atoms,
    wherein:
        no vinyl pyridine is used in the polymerization,
        the polymer latex is polymerized in the presence of said at least one chain transfer agent,
        the polymer latex does not comprise structural units based on unsaturated carboxylic acids and/or does not comprise carboxylic groups, the polymer latex comprises a solids content of from 55% to 85%, and the dried latex polymer has a Mooney viscosity measured according to DIN 53 523 of 85 to 155.

2. The polymer latex according to claim 1, wherein the conjugated diene monomer is selected from the group consisting of 1,3-butadiene, 2-chloro-1,3-butadiene, isoprene, conjugated straight-chain and branched pentadienes and hexadienes, and combinations thereof.

3. The polymer latex according to claim 1, wherein the aromatic vinyl monomer is selected from the group consisting of styrene, α-methyl styrene, 4-methyl-styrene, α-chloro styrene, 4-chloro styrene, divinylbenzene, 4-methoxy-3-methylstyrene, 3,4-dimethyl-α-methylstyrene, and combinations thereof.

4. The polymer latex according to claim 1, comprising 5 to 40 weight percent aromatic vinyl monomer based on the total weight of polymer particles present in the latex.

5. The polymer latex according to claim 1, comprising 60 to 95 weight percent conjugated diene monomer based on the total weight of polymer particles present in the latex.

6. The polymer latex according to claim 1, wherein the latex does not comprise structural units based on acrylic acids.

7. The polymer latex according to claim 1, wherein the latex does not comprise structural units based on (α,β)-unsaturated monocarboxylic acids.

8. The polymer latex according to claim 1, wherein the linear alkyl group R of the chain transfer agent RSH is selected from an alkyl group having 3, 4, 5, 6, 7, 8, 9, 10, 11, 12, 13, 14, 15, 16, 17, 18, 19 or 20 carbon atoms.

9. The polymer latex according to claim 8, comprising n-dodecyl mercaptan as chain transfer agent.

10. The polymer latex according to claim 1, wherein the Mooney viscosity is 90 to 150.

11. The polymer latex according to claim 1, wherein the polymer particles have a single glass transition temperature (Tg) from −75 to −25° C. measured according to the differential scanning calorimetry (DSC DIN 53765).

12. A method for making a latex foam, comprising:
 a) compounding the polymer latex of claim 1 into a foamable and vulcanizable latex compound;
 b) foaming the vulcanizable latex compound;
 c) filling the foam obtained in step b) into a mold of desired shape;
 d) stabilizing the foam structure;
 e) vulcanizing the foam; and
 f) removing the vulcanized latex foam from the mold.

13. The method of claim 12, further comprising adding a gelling agent to make the foamable and vulcanizable latex compound, wherein the foaming is solely achieved by mechanical means and the foam structure is stabilized by at least partially gelling the latex foam prior to vulcanization.

14. The method of claim 12, wherein the vulcanizable latex compound is first foamed by mechanical means and then filled into a vacuum mold, then the foam is expanded to the volume of the mold by application of vacuum, and the foam structure is stabilized by rapid cooling of the foam followed by pressurizing the mold with carbon dioxide thereby causing at least partial gelling of the foam prior to vulcanization.

15. An article comprising latex foam obtained from polymer latex of claim 1.

16. The article of claim 15, selected from the group consisting of sealings, can sealings, carpets, mattresses, pillows, neck rests, toppers, shock absorbers, shaped parts of shoes, shoe inside soles, garments padding, protectors for sportswear, athletic implements, bike saddles, motorbike saddles, furniture upholstery material, bumpers, and automotive dashboard carpets.

17. A method for making a latex sealing and/or latex film, comprising:
 a) compounding the latex of claim 1, and
 b) applying the latex compound to a substrate.

18. An article comprising a latex sealing and/or latex film obtained from a latex of claim 1.

19. The article of claim 18, selected from the group consisting of sealings, can sealings and adhesives.

20. A method of making a polymer latex according to claim 1 by free-radical polymerization comprising the step of polymerizing at least one conjugated diene monomer and at least one aromatic vinyl monomer in the presence of at least one chain transfer agent having the general formula RSH, wherein R is a linear alkyl group having 3 to 20 carbon atoms, wherein no vinyl pyridine is used in the polymerization, and wherein the dried latex polymer has a Mooney viscosity measured according to DIN 53 523 of 85 to 155.

* * * * *